United States Patent [19]

VanRyck

[11] 4,253,641
[45] Mar. 3, 1981

[54] BUTTERFLY VALVE AND PERIMETER SEAL

[76] Inventor: Theodore H. VanRyck, 710 Claremont St., Tacoma, Wash. 98466

[21] Appl. No.: 967,356

[22] Filed: Dec. 7, 1978

[51] Int. Cl.³ .............................................. F16K 1/226
[52] U.S. Cl. ..................................... 251/306; 251/368
[58] Field of Search ............... 251/305, 306, 307, 308, 251/368

[56] References Cited

U.S. PATENT DOCUMENTS

| 3,329,398 | 7/1967 | Goldsmith | 251/306 |
|---|---|---|---|
| 3,565,394 | 2/1971 | Smith | 251/306 |
| 3,572,632 | 3/1971 | Bengtsson | 251/306 |
| 3,595,523 | 7/1971 | Felton | 251/306 |
| 3,675,677 | 7/1972 | Scaramucci | 251/306 |
| 3,857,546 | 12/1974 | Quirk | 251/368 |
| 3,880,189 | 4/1975 | Bennett | 251/305 |
| 4,055,323 | 10/1977 | Gachot | 251/306 |

FOREIGN PATENT DOCUMENTS

| 362690 | 4/1921 | Fed. Rep. of Germany | 251/306 |
|---|---|---|---|
| 699819 | 11/1940 | Fed. Rep. of Germany | 251/305 |
| 1083611 | 6/1960 | Fed. Rep. of Germany | 251/305 |
| 1475931 | 3/1969 | Fed. Rep. of Germany | 251/306 |
| 1130544 | 2/1957 | France | 251/306 |
| 1295203 | 7/1960 | France | 251/306 |
| 1383349 | 2/1975 | United Kingdom | 251/306 |

Primary Examiner—William R. Cline
Assistant Examiner—H. Jay Spiegel
Attorney, Agent, or Firm—Christensen, O'Connor, Johnson & Kindness

[57] ABSTRACT

An improved, large diameter butterfly valve specially adapted for use in corrosive or high temperature environments. The valve closure plate of the butterfly valve includes a frame comprised of a shaft, an annular flat bar defining the perimeter of the frame and lightweight stringers extending from the shaft to the flat bar. An elastomeric material is formed around the peripheral portion of the flat bar to provide a sealing flange extending radially outwardly from the periphery of the frame. Balsa filler panels are disposed between the stringers and extend from the shaft to the flat bar. The exterior of the valve closure plate is formed by a shell of glass fiber reinforced resin laid over and adhered to the frame and the balsa filler panels. The elastomeric sealing flange extends radially outwardly beyond the resin exterior shell so as to contact a seat on the housing of the butterfly valve when the closure plate is in a closed position, thereby forming a fluid tight seal.

13 Claims, 8 Drawing Figures

BUTTERFLY VALVE AND PERIMETER SEAL

BACKGROUND OF THE INVENTION

The present invention relates to the field of butterfly valves, and more particularly, to large diameter butterfly valves for use in corrosive and/or high temperature environments.

Many industrial operations produce or require large volumetric flows of corrosive and/or high temperature gases. Flow control is often provided by means of large diameter butterfly valves. In general, it is desirable that these butterfly valves include a relatively lightweight valve closure plate which is durable and corrosion resistant, together with a durable, fluid tight seal between valve closure plate and the valve housing of the butterfly valve. To obtain a fluid tight seal, current large diameter butterfly valves generally employ one of two sealing configurations, both utilizing an elastomeric O-ring adjacent the periphery of the valve closure plate. A first type uses an O-ring seal seated in an annular groove disposed on the periphery of the valve closure plate, while a second type uses an O-ring seal seated in an annular groove disposed on the valve housing of the butterfly valve. In both sealing configurations, as the valve closure plate is rotated to a closed position, the elastomeric O-ring contacts a corresponding surface on, in the former seal configuration, the valve housing or, in the latter, the periphery of the valve closure plate. This causes the O-ring to resiliently compress along its entire circumference to form a fluid tight seal between the closure plate and the housing. While both of the above seal configurations can provide acceptable seals, they have proved susceptible to the same problem—the lateral forces imposed on the O-ring seal during the opening and closing sequences of the closure plate tend to cause the O-ring seal to roll out of its annular groove, separating it from its seat and destroying the seal.

Therefore, a general object of the present invention is to provide an improved structure for a large diameter butterfly valve.

A further object of the present invention is to provide an improved seal configuration for the valve closure plate which is fluid tight and durable.

Yet a further object of the present invention is to provide such a seal configuration fabricated from an elastomeric material which can be securely affixed to the valve structure and is not susceptible to being dislodged from its sealing position upon repeated opening and closing of the valve.

Another object of the present invention is to provide such a valve closure plate which is fabricated from lightweight, durable and corrosion resistant materials.

SUMMARY OF THE INVENTION

Accordingly, to accomplish these and other objects, the present invention provides a large diameter butterfly valve having a valve closure plate which includes a disc shaped frame rotatably mounted in a valve housing. An annular flange is affixed to and extends radially outwardly from the frame. A resilient, elastomeric seal is affixed to and extends radially outwardly from the annular flange so as to contact an annular seat on the valve housing when the valve closure plate is in a closed position.

More particularly, the framework of the valve closure plate includes a shaft welded at each end to an annular flat bar (which defines the perimeter of the valve closure plate), together with a plurality of stringers oriented in spaced, parallel relationship between and welded to the shaft and the flat bar. Balsa filler panels are disposed between the stringers, extending from the shaft to the flat bar.

The elastomeric seal is comprised of a layer of resilient, durable polymeric material formed around the outer peripheral edge portion of the flat bar. The seal has inner edge portions that are coextensive with and affixed to the radially extending sides of the annular flat bar, and a peripheral edge portion that extends radially outwardly beyond the periphery of the flat bar. The seal is securely attached to the structure of the valve closure plate.

A reinforced resin shell forms the exterior of the valve closure plate, the resin being formed over and adhered to the framework and filler panels. The exterior resin shell covers opposite sides of the closure plate, extending radially outwardly to a location adjacent the outside edge of the annular flat bar but terminating short of the peripheral edge portion of the elastomeric seal. Thus, the resin shell covers the inner edge portions of the elastomeric seal while leaving the peripheral edge portion of the seal extending radially beyond the shell.

BRIEF DESCRIPTION OF THE DRAWINGS

The novel features believed to be characteristic of the present invention are set forth in particularity in the appended claims. However, a more complete appreciation of the present invention, both as to construction and mode of operation, and the attendant advantages thereof will result as the same becomes better understood by reference to the following detailed description of the preferred embodiment when considered in conjunction with the accompanying drawings, wherein:

DESCRIPTION OF THE PREFERRED EMBODIMENT

Figure 1:
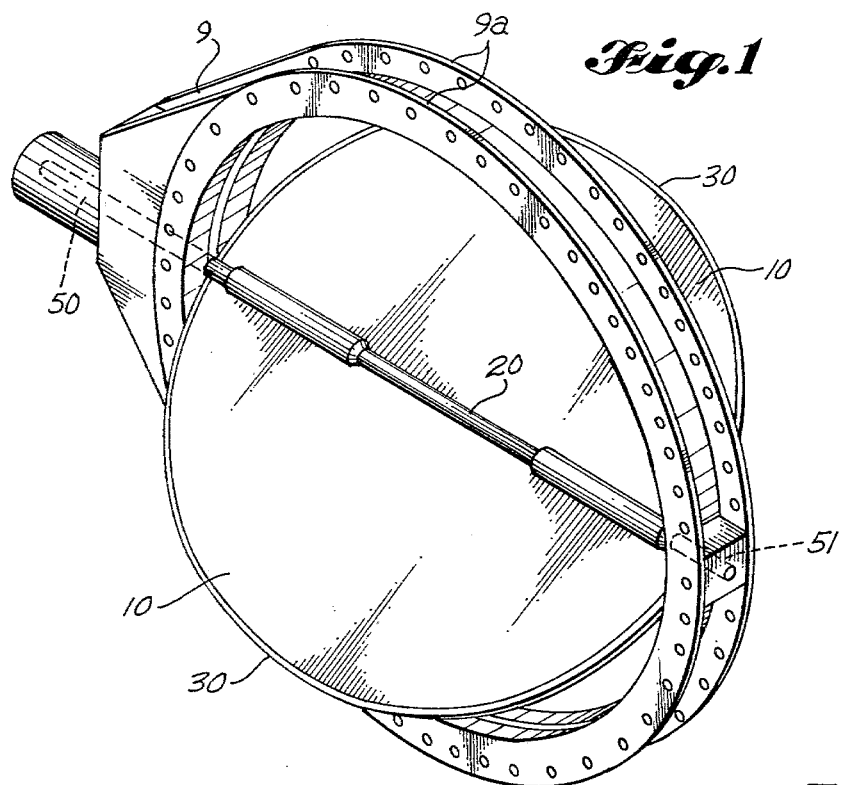
FIG. 1 is an isometric view of the butterfly valve in accordance with the present invention showing the valve closure plate rotatably mounted within the housing.
Figure 3:
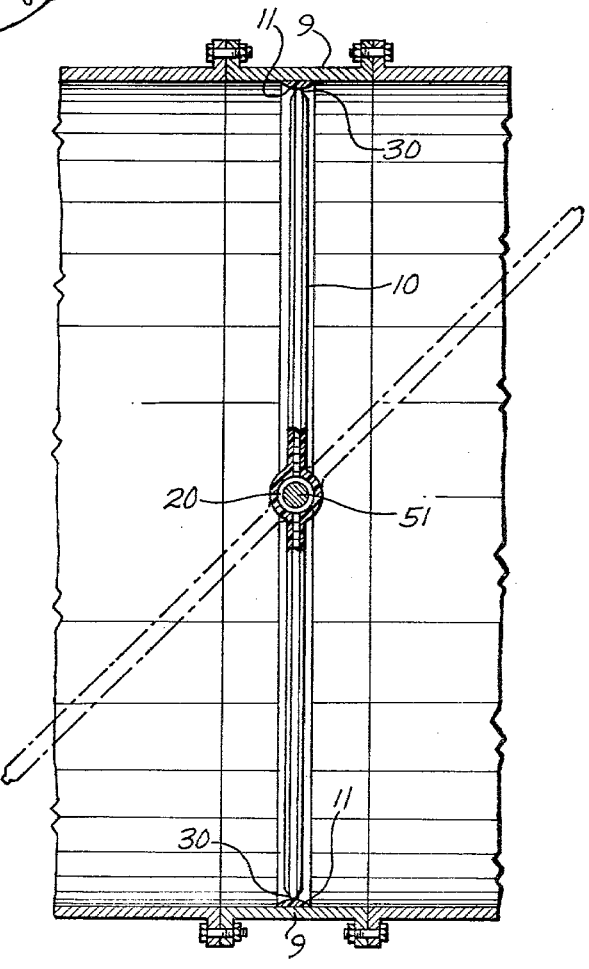
FIG. 3 is a side elevation view of the butterfly valve according to the present invention showing the valve housing in longitudinal section, and the valve closure plate with a portion thereof adjacent the mounting shaft broken away.

Referring to the drawings wherein like reference characters designate like or corresponding elements throughout the several views, and particularly to FIGS. 1 and 3, the large diameter butterfly valve of the present invention comprises a valve housing 9 and a valve closure plate 10. The valve housing 9 is a pipe section of glass-reinforced resin material having integral, radially extending mounting flanges 9a for joinder of the housing to like flanges on a pipe. Valve closure plate 10 is disc shaped and is rotatable about the axis of a tubular shaft 20, which is coincident with a diameter of the plate, from a closed position orthogonal to the direction of fluid flow through the housing to an open position parallel to the direction of fluid flow. A midopen position of the valve closure plate is shown at 10' in FIG. 3 to indicate that the valve can be partially closed. Valve closure plate 10 has a lightweight frame, the exterior of which is formed by a reinforced resin shell, to be described in greater detail below. A pair of mounting shafts 50 and 51 mount the valve closure plate for rotation within valve housing 9. The mounting shafts are inserted in the tubular shaft 20 in a manner described in more detail below. An elastomeric sealing member 30 extends radially outwardly from the peripheral edge portion of valve closure plate 10 to form a resilient perimeter seal. When the valve closure plate is rotated to the closed position, this resilient sealing member contacts, and is compressed by, a raised seat 11 which is integral with valve housing 9. Raised seat 11 extends radially inward from the inside surface of the valve housing to form a continuous, annular sealing surface disposed transversely to the longitudinal axis of the valve housing so as to contact the entire periphery of sealing flange 30 when the closure plate 10 is in the closed position.

Figure 2:
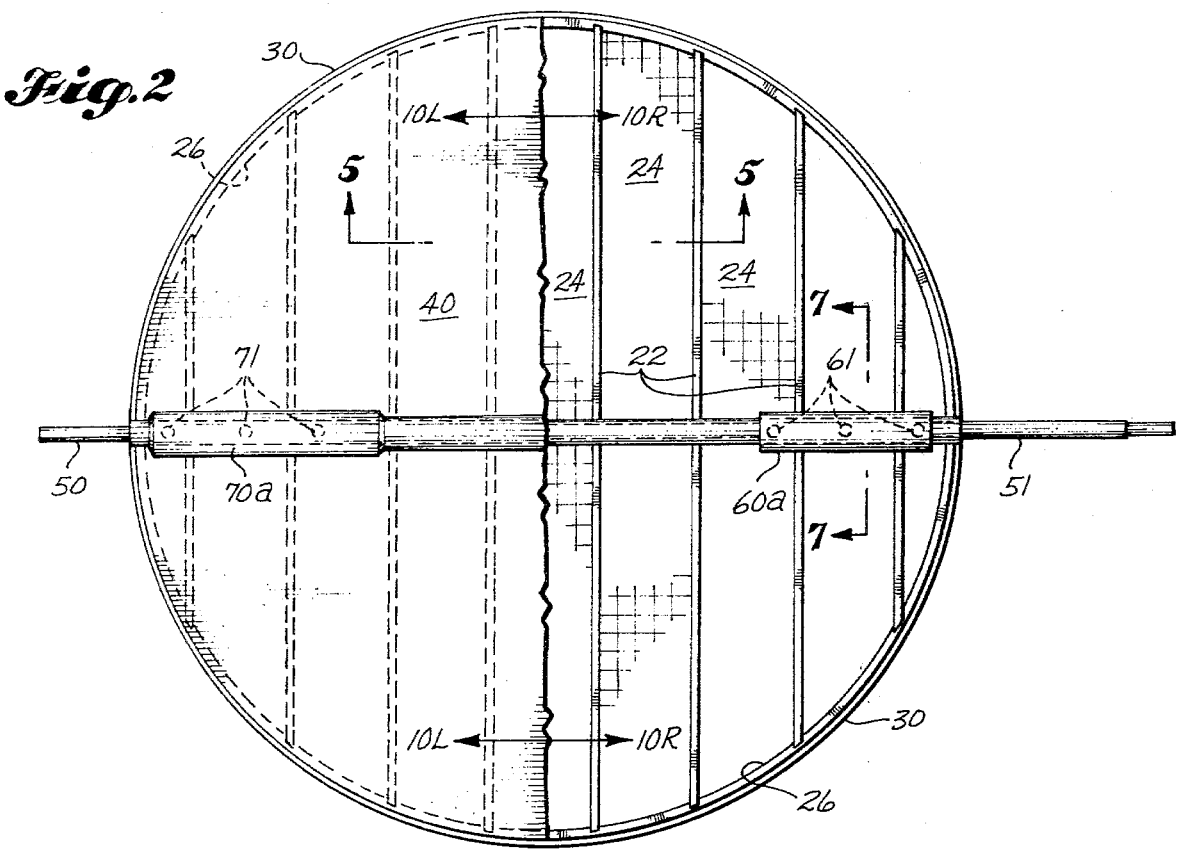
FIG. 2 is a plan view of the valve closure plate with the glass-reinforced resin surface broken away in the right half of the view to expose the framing, filler and elastomeric seal.

Referring to the plan view in FIG. 2, in order to aid in the description of valve closure plate 10, the exterior reinforced resin shell of the valve closure plate appears only in the left half portion (10L) of this view and the resin shell is broken away to expose the interior of the valve closure plate in the right half portion (10R). The two halves of the closure plate are symmetrical about a diameter of the plate orthogonal to its rotational axis. The ensuing description or discussion of an element or elements in one half of the figure applies equally to the corresponding element or elements in the other half. Now, considering the right half portion (10R) of valve closure plate 10, the framework of the closure plate is comprised of tubular shaft 20, an annular flat bar 26 and a plurality of stringers 22 disposed perpendicularly to the tubular shaft 20 and oriented in spaced parallel relationship between and welded to the shaft and the annular flat bar. For a preferred embodiment, tubular shaft 20, annular flat bar 26 and stringers 22 can be fabricated from stainless steel.

Figure 4:
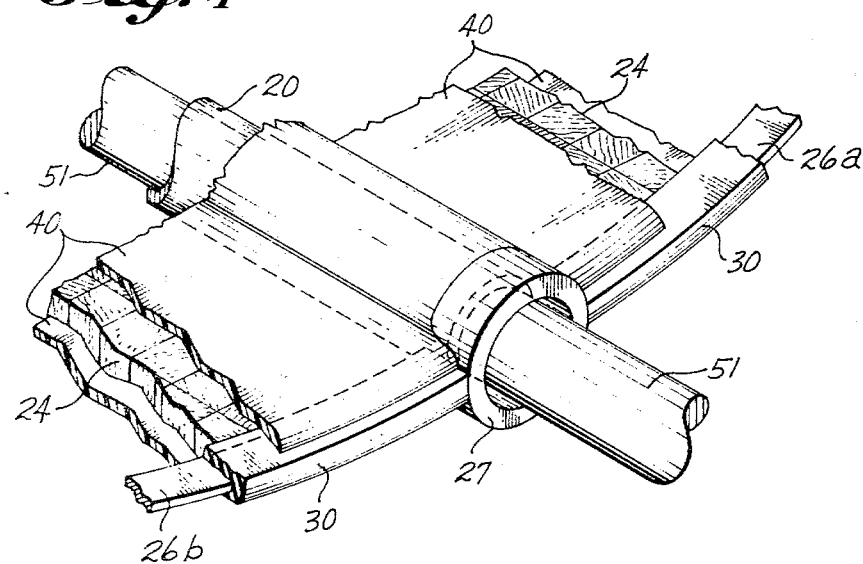
FIG. 4 is an isometric view of a portion of the perimeter of the valve closure plate showing portions of the shaft, a balsa filler panel, and the exterior resin shell.

Annular flat bar 26, which defines the perimeter of the frame of the valve closure plate is actually comprised of two rigid, semicircular bars 26a and 26b, each forming one-half of the perimeter. As best seen in FIG. 4, the two semicircular bars of annular flat bar 26 are welded at the right end of tubular shaft 20 to a support ring 27 which, in turn, is disposed around and welded to the tubular shaft. Semicircular bars 26a and 26b of annular flat bar 26 form a rigid, annular perimeter which defines the plane of symmetry along the major dimension of valve closure plate 10.

Figure 5:
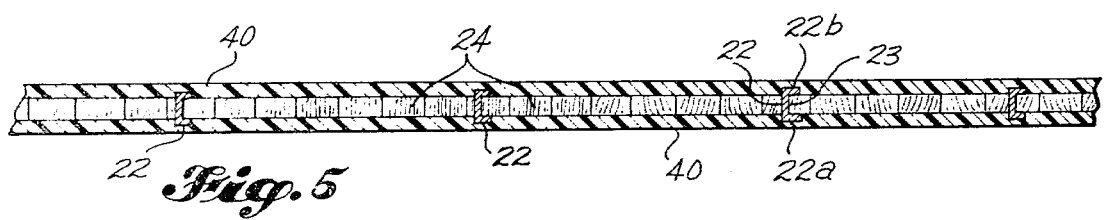
FIG. 5, taken along section line 5—5 in FIG. 2, is a sectional view of a portion of the valve closure plate.

Referring to FIG. 5, each of the stringers 22 is U-shaped and formed to provide a channel guide 23 on one side thereof. Channel guide 23 is formed by integral side flanges 22b and 22c extending perpendicularly outward from a web 22a of each stringer.

Figure 6:
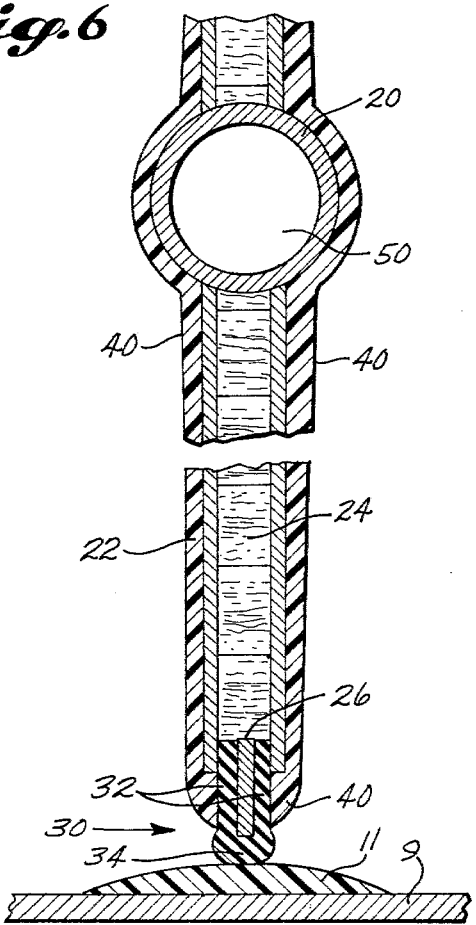
FIG. 6 is a sectional view of the valve closure plate taken along a diameter of the plate perpendicular to its rotational axis, which has been segmented to show the perimeter of the valve closure plate in more detail.

Sealing member 30 comprises a layer of resilient polymeric material formed around and secured to annular flat bar 26 so as to provide a continuous seal extending radially outwardly beyond the periphery of the frame of valve closure plate 10. As best seen in FIG. 6, sealing member 30 is molded around annular flat bar 26, being adjacent to and coextensive with the radially extending side surfaces of the flat bar and extending continuously and arcuately around its peripheral edge to form the perimeter seal for valve closure plate 10. Thus, the sealing member has inner edge portions 32 contiguous with the radially extending sides of the annular flat bar, and a peripheral sealing portion 34 which extends radially outwardly around and beyond the periphery of the flat bar. In this manner, the elastomeric material of the sealing member contacts to the fullest extent possible the side and peripheral edge surfaces of the annular flat bar. This extended interface between elastomeric sealing member 30 and annular flat bar 26 permits the sealing member to be more securely affixed to valve closure plate 10 than would be possible with a conventional O-ring configuration.

Sealing member 30 can be formed of any suitable, durable polymeric material which exhibits the degree of resistance to corrosion and thermal degradation necessary for the anticipated operating environment of the butterfly valve. Such an elastomeric material may be of a type which can be extruded and adhesively applied to annular flat bar 26. Alternately, and presently preferred, sealing member 30 can be formed from a vulcanizable, elastomeric material such as an ethylene-propylene-hexadiene terpolymer (EPDM), commercially available from a number of sources such as the DuPont Company (trade name "Nordel"). EPDM is heat curable and exhibits good resistance to high temperature (300° F.) degradation and corrosion. To form sealing member 30, the EPDM (commercially available in rolls) is cut into strips which are formed around annular flat bar 26 and secured thereto by a suitable adhesive. The EPDM is then heat cured in accordance with the manufacturer's instructions and specifications. The resulting sealing member is resilient and durable and is molded in the desired shape and securely affixed to the frame of the valve closure plate.

Referring again to the right half portion (10R) of the valve closure plate in FIG. 3, balsa filler panels 24 are disposed between the stringers 22 extending in spaced parallel relation from shaft 20 to annular flat bar 26. Each of balsa filler panels 24 is commercially available in the form of adjacent blocks of balsa of the appropriate thickness disposed between and adhered to flexible sheets. As best seen in FIG. 5, one edge of each filler panel is disposed in the channel guide 23 of a respective stringer, while the other edge is wedged against the side of the web portion 23a opposite the channel guide 23 of the opposite stringer. While other suitable filler material may be used, balsa is chosen for a preferred embodiment because of its light weight.

Figure 7:
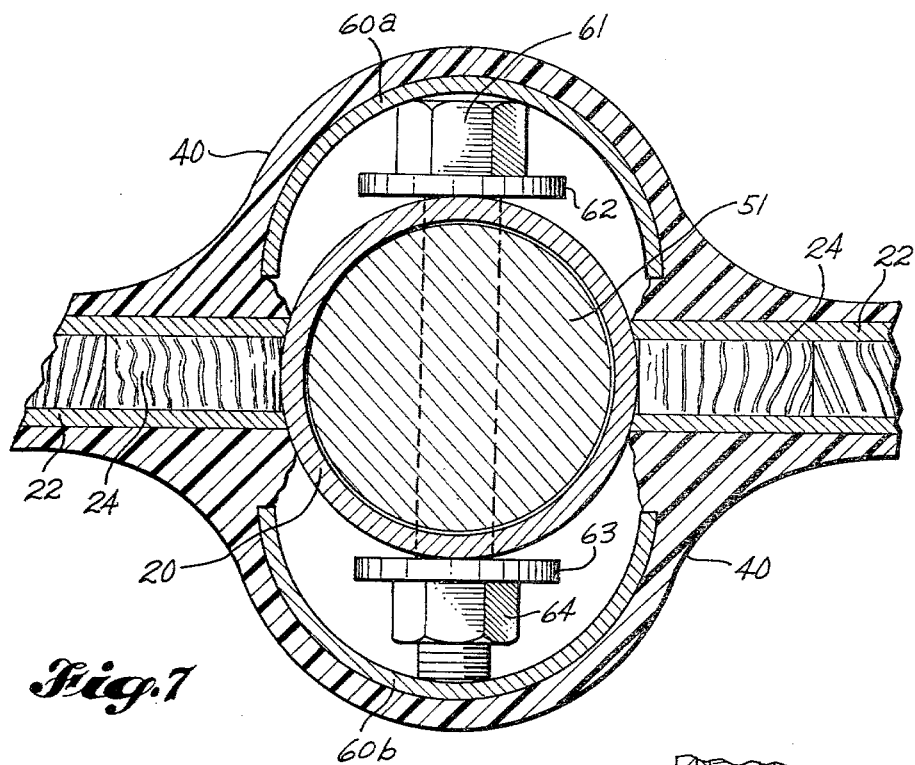
FIG. 7, taken along section line 7—7 in FIG. 2, is a sectional view of the assembly for fastening the shaft to the valve closure plate; and, FIG. 8 is a sectional view similar to that of FIG. 6 which has been segmented to show in detail an alternate embodiment in which the seal member of the present invention is affixed to the housing of the butterfly valve.

Referring now to FIGS. 3 and 7, valve closure plate 10 is pivotably mounted in valve housing 9 by means of a pair of mounting shafts 50 and 51 (FIG. 3). Mounting shafts 50 and 51 are each configured at one end to be slidably inserted into the tubular shaft 20 of the valve closure plate. Mounting shaft 51 and tubular shaft 20 are provided with mutually aligned, diametric bores. Bolts 61 are inserted through the aligned sets of bores and through washers 62 and 63, and are secured in the bores by retainer nuts 64, thus affixing the mounting shaft 51 to the tubular shaft 20.

After mounting shaft 51 is secured in the right end of tubular shaft 20, the fastening assemblies which include bolts 61 protrude from opposite sides of the tubular shaft (FIG. 7). The protruding nuts, boltheads and bolt ends of the fastening assemblies are covered by respective half-pipe sections 60a and 60b. Half-pipe sections 60a and 60b comprise the two sections of a pipe section which has been longitudinally split in half. The pipe section from which half-pipe sections 60a and 60b are formed should be of sufficient diameter and length to completely cover the protruding portions of the fastening assemblies. (Identical half-pipe sections cover bolt assemblies 71 which attach mounting shaft 50 to the opposite end of the axial shaft, only half-pipe section 70a being indicated in FIG. 2.) The half-pipe sections are provided to protect the exterior reinforced resin shell 40 from being subjected to concentrated stress patterns created by the abrupt corners on the protruding portions of the fastening assembly.

The exterior shell of valve closure plate 10 is comprised of a glass-fiber-reinforced resin material 40, formed over the frame of valve closure plate 10 as indicated in the left half portion (10L) of FIG. 2. In a preferred embodiment, reinforced resin shell 40 extends radially outwardly to a location adjacent the peripheral edge of the framework of valve closure plate 10, i.e., adjacent the peripheral edge of annular flat bar 20. As best seen in the cross section in FIG. 6, reinforced resin 40 extends over and is bonded to inner edge portions 32 of sealing member 30 which are contiguous with and affixed to the radially extending sides of annular flat bar 26. Thus, reinforced resin material 40 forms a continuous, exterior sheet or shell over shaft 20, stringers 22, balsa filler panels 24, a half-pipe section 70a and the inner edge portions of sealing member 30. The exterior sheet of resin provides a durable, corrosion resistant exterior and, further, increases the structural rigidity of the valve closure plate.

The present invention has been described in relation to a preferred valve closure plate including a novel sealing member. The valve closure plate is lightweight, strong and durable, as well as being resistant to high temperature degradation and corrosion. Moreover, the elastomeric sealing member is securely affixed to, and forms essentially an integral part of, the closure plate structure. The sealing member is constructed so as to resist the tendency to separate from the closure plate structure when subjected to the lateral forces attendant to the opening and closing sequences of the closure plate. Specifically, the sealing member is first secured to the closure plate structure by molding it around, and adhering it to, the annular flat bar. Secondly, the exterior reinforced resin shell of the closure plate overlays the inner portions of the sealing member to further secure the member to the closure plate and to further increase its lateral stability.

Other embodiments and modifications of the present invention will readily be apparent to those of ordinary skill in the art having the benefit of the teachings presented in the foregoing description of the preferred embodiment and the drawings. It is therefore to be understood that this invention is not to be construed as limited to the recitations in the preferred embodiment but that the modifications and embodiments are intended to be included within the scope of the appended claims.

Figure 8:
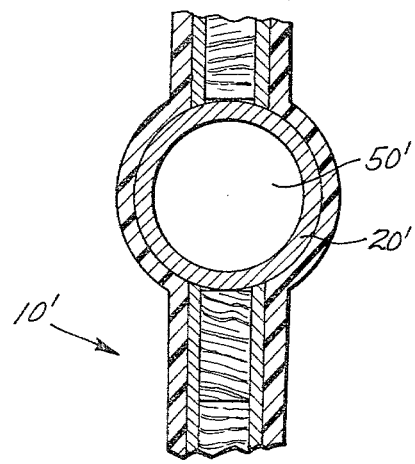
Figure 8:
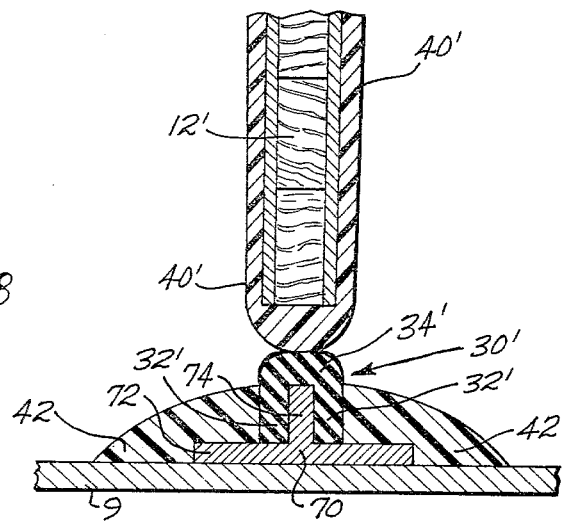

For example, FIG. 8 shows an alternate embodiment of the butterfly valve in which the perimeter sealing configuration is located on the reinforced resin valve housing 9. Thus, the alternate sealing structure comprises an annular T-flange 70 including an annular base ring 72. The annular base ring is positioned in a plane orthogonal to the axis of the valve housing and adhered to the inside of valve housing 9'. The annular T-flange 70 also includes an annular flange 74 which is integral with and has side surfaces extending radially inwardly from base ring 72 to an inner peripheral edge adjacent the outer peripheral edge of a valve closure plate 10'. The annular flange is radially aligned with closure plate 10' when the closure plate is in its closed position. Valve closure plate 10' includes a framework 12' over which is formed an exterior reinforced resin shell 40' extending continuously around the outside peripheral edge of the framework of valve closure plate 10'. An elastomeric sealing member 30' is formed around and adhered to annular flange 74, extending radially inwardly from base ring 72 along the sides of annular flange 70 continuously around the peripheral edge of the flange. The sealing member comprises side portions 32' adjacent and adhered to the radially extending sides of the annular flange, and a peripheral sealing portion 34' which extends radially inwardly from the periphery of the annular flange. Annular reinforced resin fillets 42 are bonded to and formed between, respectively, opposite side portions 32' of the sealing member 30' and the adjacent inner surface portions of the valve housing 9. The resin fillets 42 cover side portions 32'. The peripheral sealing portion 34' of the sealing member extends radially inwardly from the innermost portions of resin fillets 42. In a manner analogous to the preferred embodiment, when valve closure plate 10' is rotated to its closed position, the peripheral edge of exterior shell 40' contacts and compresses the peripheral sealing portion 34' of the resilient, elastomeric sealing flange 30'. This forms a fluid tight seal along the entire circumference of valve closure plate 10'.

As a further example of an included modification, the elastomeric seal member 30 need not be molded around the annular flat bar 26. Although this configuration for seal member 30 is preferred, for the reasons indicated in the above description of the preferred embodiment, the elastomeric material of the seal member may be configured to extend radially outwardly from the annular flat bar 26 without being formed around any portion of the annular flat bar.

The embodiments of the invention in which an exclusive property or privilege is claimed are defined as follows:

1. In a butterfly valve including a tubular valve housing having an interior annular seat, an improved closure plate and seal comprising:

a disc shaped frame rotatably mounted in said housing about an axis substantially coincident with a diameter of said frame; said frame being rotatable between open and closed positions, an annular flange affixed to and extending radially outwardly from said frame so that the outer peripheral edge of said flange is adjacent the annular seat when said frame is in the closed position, said annular flange having sides extending from the outer peripheral edge of said flange radially inwardly relative to said frame, a resilient, elastomeric seal affixed to and extending radially outwardly from said flange sufficiently far to be resiliently compressed against said seat when said frame is in the closed position, said seal being a layer of resilient elastomeric material affixed to the sides of and extending continuously around the outer peripheral edge of said flange, said seal having inner edge portions contiguous with the sides of said flange, and separate structural, glass-reinforced resin surface layers, each said surface layer being affixed to the opposite disc-shaped sides of said frame, the outer peripheral edges of said surface layers overlying at least portions of the radially extending sides of said flange so as to rigidly overlay and be bonded to the inner edge portions of said seal.

2. The closure plate and seal defined in claim 1 wherein the outer peripheral edges of said reinforced resin layers terminate adjacent the outside peripheral edge of said flange.

3. The closure plate and seal defined in claim 2 wherein said flange is of rectangular cross section, with the radially extending side width being substantially greater than the outer peripheral edge thickness.

4. The valve closure plate and seal defined in claim 5 wherein said disc shaped frame comprises:
   a plurality of stringers attached to said flange; and
   a plurality of filler panels disposed between said stringers and extending to the inside peripheral edge of said flange.

5. The valve closure plate and seal defined in claim 4 wherein said disc shaped frame further includes a tubular shaft disposed along the axis of rotation of said frame and affixed to respective ends to said annular flange.

6. The valve closure plate and seal defined in claim 5 wherein each of said plurality of stringers is coupled between said shaft and said annular flange, extending perpendicularly from said shaft in spaced, parallel relation.

7. The valve closure plate and seal defined in claim 5 further including a pair of mounting shafts each adapted to being slidably inserted, and fixedly retained, within a respective end of said tubular shaft, each of said mounting shafts extending radially beyond the outer periphery of said closure plate so as to mount said closure plate within said housing.

8. The valve closure plate and seal defined in claim 7 wherein the resilient elastomeric material of said seal is comprised of a vulcanizable polymeric material.

9. The valve closure member as defined in claim 8 wherein said filler panels are comprised of balsa.

10. In a butterfly valve which includes a disc shaped valve closure plate rotatably mounted with a tubular valve housing, the closure plate being rotatable between open and closed positions, an improved peripheral seal comprising:
    an annular flange affixed to and extending radially inwardly from said valve housing so that the inner peripheral edge of said flange is adjacent the outer peripheral edge portion of said valve closure plate when the closure plate is in a closed position, said annular flange having sides extending from the inner peripheral edge of said flange radially outwardly relative to said valve housing, and
    a resilient, elastomeric seal member affixed to and extending radially inwardly from said flange sufficiently to be resiliently compressed against the outer peripheral edge portion of said valve closure plate when said closure plate is in a closed position, said seal member being a layer of resilient elastomeric material affixed to the sides and being molded continuously around the inner peripheral edge of said flange, said seal member having side portions contiguous with the sides of said flange, and
    annular reinforced resin fillets bonded to and formed between, respectively, opposite side portions of said seal member and the adjacent surfaces of said valve housing to sandwich said side portions and said flange therebetween, thereby retaining said side portions against said flange upon engagement of said seal with said closure plate.

11. The peripheral seal defined in claim 10 wherein said annular flange is of rectangular cross section with the radially extending side width being substantially greater than the outer peripheral edge thickness.

12. The peripheral seal defined in claim 11 wherein said seal member is comprised of a vulcanizable polymeric material.

13. In a butterfly valve including a tubular valve housing having an interior annular seat, an improved closure plate and seal comprising:
    a disc-shaped frame rotatably mounted in said housing about an axis substantially coincident with a diameter of said frame; said frame being rotatable between open and closed positions, said disc-shaped frame including a plurality of stringers attached to said flange, a plurality of filler panels disposed between said stringers and extending to the inside peripheral edge of said flange, a tubular shaft disposed along the axis of rotation of said frame and affixed to respective ends to said annular flange, each of said plurality of stringers being coupled between said shaft and said annular flange and extending perpendicularly from said shaft in spaced, parallel relation, each of said plurality of stringers being formed to provide at least one channel guide disposed so that the edge of a corresponding filler panel can be inserted and retained therein,
    an annular flange affixed to and extending radially outwardly from said frame so that the outer peripheral edge of said flange is adjacent the annular seat when said frame is in the closed position, said annular flange having sides extending from the outer peripheral edge of said flange radially inwardly relative to said frame, said flange having a rectangular cross section, the width of the radially extending side of said flange being substantially greater than the outer peripheral edge thickness of said flange,
    a resilient, elastomeric seal affixed to and extending radially outwardly from said flange sufficiently far to be resiliently compressed against said seat when said frame is in a closed position, said seal being composed of a layer of resilient, elastomeric material affixed to the sides and extending continuously around the outer peripheral edge of said flange, said seal having inner edge portions contiguous with the sides of said flange, and
    separate glass-reinforced resin surface layers, each surface layer being affixed to the opposite disc-shaped surfaces of said frame, the outer peripheral edges of said surface layers overlying at least portions of the radially extending sides of said flange so as to overlay the inner edge portions of said seal, the outer peripheral edges of said surface layers terminating adjacent the outside peripheral edge of said flange.

* * * * *

UNITED STATES PATENT AND TRADEMARK OFFICE
CERTIFICATE OF CORRECTION

PATENT NO. : 4,253,641
DATED : March 3, 1981
INVENTOR(S) : Theodore H. Van Ryck

It is certified that error appears in the above-identified patent and that said Letters Patent are hereby corrected as shown below:

Column 7, line 27: "claim 5" is changed to --claim 3--.

Column 7, line 54: "with" is changed to --within--.

Signed and Sealed this

Second Day of June 1981

[SEAL]

Attest:

RENE D. TEGTMEYER

Attesting Officer       Acting Commissioner of Patents and Trademarks